United States Patent [19]
Keck

[11] 3,716,582
[45] Feb. 13, 1973

[54] SULFOPHENYLINDAN DICARBOXYLIC ACID AND DERIVATIVES THEREOF

[75] Inventor: Max H. Keck, Cuyahoga Falls, Ohio

[73] Assignee: The Goodyear Tire & Rubber Company, Akron, Ohio

[22] Filed: Aug. 6, 1970

[21] Appl. No.: 61,787

Related U.S. Application Data

[62] Division of Ser. No. 794,415, Jan. 27, 1969, Pat. No. 3,554,975.

[52] U.S. Cl. ............................................200/507 R
[51] Int. Cl. ............................................C07c 143/52

[58] Field of Search ..................................261/507 R

[56] References Cited

UNITED STATES PATENTS 2,393,526   1/1946   Flett ....................................260/507

Primary Examiner—Daniel D. Horwitz
Attorney—F. W. Brunner and J. M. Wallace, Jr.

[57] ABSTRACT

The invention relates to sulfophenylindan dicarboxylic acids, salts and esters thereof and to polyester resins containing units of these materials. The polyester resins have improved dye receptivity.

3 Claims, No Drawings

SULFOPHENYLINDAN DICARBOXYLIC ACID AND DERIVATIVES THEREOF

This is a division of application Ser. No. 794,415, filed Jan. 27, 1969, now U.S. Pat. No. 3,554,975.

This invention relates to a novel sulfonated dicarboxylic acid and ester thereof. The invention also relates to new linear polyesters derived from the sulfonated dicarboxylic acid and to fibers, films and other articles produced therefrom.

In accordance with this invention it has been found that sulfophenylindan dicarboxylic acids and esters thereof represented by the following structural formula:

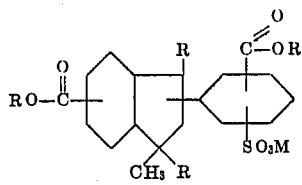

wherein M designates an alkali metal atom and R represents hydrogen or a radical selected from the group consisting of alkyl, aryl, alkaryl and aralkyl radicals and $R_2$ and $R_3$ are alkyl radicals containing one to four carbon atoms, can be readily prepared by reacting phenylindan dicarboxylic acid with 20 percent fuming sulfuric acid to form the sulfonated acid which can be converted to the dicarboxylic ester by esterifying with an alcohol and forming the salt of the sulfonic acid by neutralization with appropriate alkali. In the above formula the alkali metal can be a member of the group of lithium, sodium, potassium, rubidium and cesium. Representative examples of the radicals represented by R are alkyl radicals methyl, ethyl, propyl, butyl, amyl, hexyl, octyl and decyl; aryl radicals phenyl; alkaryl radicals tolyl and ethyl phenyl; and aralkyl benzyl and phenyl ethyl. The esters have excellent utility in the preparation of polymeric polyester resins. In preparing such polymers the esters can be converted to bis glycol esters by reaction with a glycol under ester interchange conditions and then the glycol esters polymerized to form linear polyesters useful in the preparation of new products, especially films and fibers, that have good cationic dyeability. The polyester resins have excellent heat stability and improved hydrolytic stability. The sulfophenylindan dicarboxylic acids and salts are also useful in the preparation of detergents, wetting agents, emulsifying agents, dyes, synthetic tanning agents, insecticides and drugs. The new acids are also a valuable intermediate in the preparation of other chemicals by replacement of the sulfonate group.

Among the polycarboxylic acids which can be sulfonated according to the invention and the acid or ester used to prepare the polyester resins of the present invention are 3-(4-carboxyphenyl)1,1,3-trimethyl-5-indan carboxylic acid, 3-(4-carboxyphenyl)-1,3-diethyl-1-methyl-5-indan carboxylic acid, 3-(4-carboxyphenyl)-1,3-dipropyl-1-methyl-5-indan carboxylic acid, 3-(4-carboxyphenyl)-1,3-dibutyl-1-methyl-5-indan carboxylic acid, 3-(3-carboxyphenyl)-1,1,3-trimethyl-6-indan carboxylic acid, 3-(3-carboxyphenyl)-1,3-diethyl-1-methyl-6-indan carboxylic acid, 3-(3-carboxyphenyl)-1,3-dipropyl-1-methyl-6-indan carboxylic acid, 3-(3-carboxyphenyl)-1,3-dibutyl-1-methyl-6-indan carboxylic acid, 3-(4-carboxyphenyl)-1,1,3-trimethyl-7-indan carboxylic acid, 3-(4-carboxyphenyl)-1,3-diethyl-1-methyl-7-indan carboxylic acid, 3-(4-carboxyphenyl)-1,3-dipropyl-1-methyl-7-indan carboxylic acid, 3-(4-carboxyphenyl)-1,3-dibutyl-1-methyl-7-indan carboxylic acid, 3-(2-carboxyphenyl)-1,1,3-trimethyl-5-indan carboxylic acid, 3-(2-carboxyphenyl)-1,3-diethyl-1-methyl-5-indan carboxylic acid, 3-(2-carboxyphenyl)-1,3-dipropyl-1-methyl-5-indan carboxylic acid, 3-(2-carboxyphenyl)-1,3-dibutyl-1-methyl-5-indan carboxylic acid, 3-(2-carboxyphenyl)-1,1,3-trimethyl-6-indan carboxylic acid, 3-(2-carboxyphenyl)-1,3-diethyl-1-methyl-6-indan carboxylic acid, 3-(2-carboxyphenyl)-1,3-dipropyl-1-methyl-6-indan carboxylic acid, 3-(2-carboxyphenyl)-1,3-dibutyl-1-methyl-6-indan carboxylic acid, 3-(2-carboxyphenyl)-1,1,3-trimethyl-7-indan carboxylic acid, 3-(2-carboxyphenyl)-1,3-diethyl-1-methyl17-indan carboxylic acid, 3-(2-carboxyphenyl)-1,3-dipropyl-1-methyl-7-indan carboxylic acid and 3-(2-carboxyphenyl)-1,3-dibutyl-1-methyl-7-indan carboxylic acid. For convenience in this specification the above dicarboxylic acids are called phenylindan dicarboxylic acids and the sulfonated products prepared from these materials are called the sulfophenyl indan dicarboxylic acids.

The sulfonated phenylindan dicarboxylic acids and the preparation of esters and potassium salts therefrom are illustrated in the following examples.

EXAMPLE 1

A three liter three neck glass reaction flask was fitted with stirrer, a thermometer and a closed charge port. A charging flask attached to the charging port was charged with 490 grams of 3-(4-carboxyphenyl)-1,1,3-trimethyl-5-indan carboxylic acid. 1174 grams of 20 percent fuming sulfuric acid were placed in a reaction flask attached to the charging flask. Over a 45 minute period the 3-(4-carboxyphenyl)-1,1,3-trimethyl-5-indan carboxylic acid was added incrementally from the charging flask to the reaction flask and the reaction mixture was rapidly stirred. The rate of addition was regulated so that each portion of the phenylindan dicarboxylic acid was quickly wet by the sulfuric acid. Gentle application of heat during the 45 minute period provided a temperature rise of from 28° to 75° C. When all of the phenylindan dicarboxylic acid had dissolved the temperature of the reaction mixture was gradually raised to 135° C. over a one hour period. The temperature was then maintained at 132° to 135° C. for 2-½ hours, after which heating was discontinued. The warm, almost black reaction mixture was poured slowly as a fine stream into 2200 milliliters of concentrated HCl maintained at 10° to 12° C. by means of an ice bath. An immediate precipitate formed as the reaction mixture contacted the HCl. This precipitate was stirred for one hour to convert it to a fine powder. The precipitate was then collected on a two-liter fritted glass funnel of medium porosity. Most of the dark color remained in the filtrate. The damp product was suspended in 1500 milliliters of fresh concentrated HCl and allowed to stand overnight. The solids were again collected on a fritted glass funnel. The material was then transferred to a large porcelain evaporating dish. It was dried at 80° to 95° C. A yield of 755 grams of product was obtained. This product may be represented by the formula:

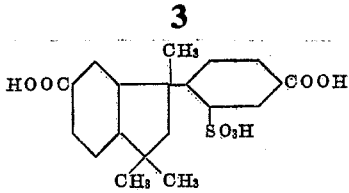

This product was transferred to a three liter three neck flask fitted with nitrogen gas inlet, a stirrer and a Dean-stark moisture trap. 450 milliliters of absolute ethanol and 750 milliliters of benzene were added to the crude sulfonated product. This mixture was stirred and heated to reflux, at which time an aqueous phase began to appear in the Dean-stark trap. After four hours reflux a total of 100 milliliters of aqueous phase had been removed from the trap. After 12 hours reflux a total of 150 milliliters of aqueous phase had been removed from the trap. An additional 100 milliliters of absolute ethanol and 150 milliliters of benzene were added to the refluxing mixture.

At the end of 20 hours of reflux, 200 milliliters of aqueous phase had been removed. An additional 100 milliliters of absolute ethanol were added. Further refluxing provided no additional aqueous phase in the trap. 350 milliliters of the reaction solvent were then gradually removed via the trap. The brown solution remaining was transferred to a three liter beaker, treated with Norite-A, filtered, and the filtrate evaporated down to a thick syrup at 65° to 70° C. This thick syrup was titrated with ethanolic KOH to a pH of about 9.0. The solvent was removed by evaporation and the resulting residue was mixed with about two volumes of boiling water, filtered to provide a clear solution, and cooled.

A yield of 118 grams of nearly white crystals was obtained. Further evaporation of the filtrate to half its original volume provided an additional yield of 290 grams of tan colored crystals. An additional 53 grams of dark tan crystals were obtained on further evaporating the liquor.

Sulfur analysis of the 118 gram and the 290 gram batches of sulfonated product indicated the presence of 6.62 and 6.63 percent sulfur respectively. This corresponds to one sulfonate group per phenylindan dicarboxylic acid unit.

As stated above, the invention also comprehends the preparation of novel linear copolyester resins which are characterized by possessing units of metallosulfophenylindan dicarboxylic acid having the following formula:

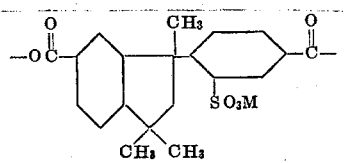

where M is an alkali metal atom.

The copolyesters are prepared according to the following examples.

EXAMPLE 2

A small glass reactor tube was charged with 61.5 grams of bis β-hydroxyethyl terephthalate, 3.74 grams of the diethyl ester of the potassium sulfophenylindan dicarboxylic acid prepared in Example 1, 5 grams of ethylene glycol, 0.0152 gram of manganous acetate and 0.0152 gram of antimony trioxide. The mixture was stirred and heated at 197° C. for one hour. The temperature was then raised to 244° C. After 45 minutes at this temperature the pressure was reduced to 0.5 Torr over a 15 minute period. The temperature was then raised to 280° C. After 2 hours at 280° C. and 0.5 Torr a polymer was obtained having an intrinsic viscosity of 0.468, a hydrolytic degradation of 0.86 percent broken bonds, and a melting point of 251° C. A sample of fiber pulled from the melt and then drawn to a 4:1 ratio at 80° C. was tested for dyeability by boiling it 45 minutes in an aqueous solution of 2 percent (based on fiber weight) of Severon Brilliant Red 3B. The fiber was dyed a deep shade of red.

EXAMPLE 3

97/3 Ethylene Terepthalate-Ethylene Sulfophenylindanate Copolyester

A stainless steel reactor was charged with 7.47 pounds of dimethyl terephthalate, 4.98 pounds of ethylene glycol, 0.595 of the diethyl ester of potassium sulfophenylindan dicarboxylic acid prepared in Example 1, and 5.12 milliliters of a 6 percent solution of manganese octanoate in mineral spirits. This mixture was heated from 167° to 230° C. over a two hour period during which a total of 1410 milliliters of methanol distilled from the reaction mixture. A 1.23 milliliter quantity of triphenyl phosphite was stirred into the mixture and the mixture was then transferred to a stainless steel polymerization vessel. 0.9091 gram of antimony trioxide was added. The reaction temperature was raised from 195° to 250° C. over a one hour period. Then the pressure in the system was gradually reduced to 1 Torr. During the next one and one-half hours the temperature was gradually increased from 250° to 280° C. The reactor was then restored to atmospheric pressure by passing nitrogen gas into the system. The polymer was extruded under slight nitrogen pressure. It had an intrinsic viscosity of 0.498, a melting point of 244° C., and a carboxyl content of 21 equivalents per $10^6$ gram. It had 0.10 percent broken bonds in the thermal degradation test and in the hydrolytic degradation test, 2.3 percent broken bonds.

Fibers made from the copolyester by melt spinning and drawing 4:1 had the properties listed in Table I below.

TABLE I

| | |
|---|---|
| Denier | 117 |
| Tenacity | 2.79 grams/denier |
| Elongation | 17.3% |
| Shrinkage | 7.8% |

A sample of these fibers was dyed with Severon Brilliant Red 3B dye without a carrier and compared with a sample of ethylene terephthalate-metallosulfoisophthalate copolymer, sold by the du Pont Company as Dacron T-64, which had been dyed with the same dye. The yarn from the metallosulfophenylindan copolymer dyed to a deeper shade than the commercially available T-64 fibers.

The following procedure was used for dyeing the above fibers. The material was placed in a beaker containing a dye bath maintained at 60° C. which was made of the following mixture:

3.28 grams yarn
0.064 gram Severon Brilliant Red 3B
Liquor to goods ratio: 20:1
2 drops acetic acid The dye bath containing the material was heated at the boiling point for one and one-half hours. The material was then removed from the bath, rinsed with water and scoured half an hour in an alkaline scour.

EXAMPLE 4

A 98/2 ethylene terephthalate-potassium sulfophenyl-indanate copolymer was prepared by the general method described in Example 3. Properties of the polymer and its fibers were as follows:

| Polymer | Fiber | |
|---|---|---|
| IV – 0.429 | Draw ratio | 6.2:1 |
| MP – 255° C. | Denier | 177 |
| TD – 0.10% BB | Tenacity | 5.56 g/d |
| HD – 1.86% BB | Tensile | 2.17 |
| | Elongation | 6.4% |
| | Shrinkage | 8.1% |

IV - Intrinsic viscosity
MP - Melting point
TD - Thermal degradation
HD - Hydrolytic degradation Samples of these fibers were dyed as described in Example 3 and were observed to be dyed a deep shade of red.

EXAMPLE 5

A 97.5/2.5 copolymer of ethylene terephthalate-ethylene potassium sulfophenylindanate was prepared as described in Example 2. This copolymer had an intrinsic viscosity of 0.448, a melting point determined by differential thermal analysis of 252° C. and a hydrolytic degradation of 0.34 percent broken bonds. A dyeability test was run on the fibers as described in Example 2 and the fibers were observed to be dyed a deep shade of red.

The percent of broken bonds on exposure to heat (or thermal stability) of each of the resins in the table was determined as follows:

About 10 grams of thoroughly dried polymer were heated in nitrogen atmosphere for two hours in a test tube inserted in an aluminum block maintained at 280° C. The intrinsic viscosity of the original polyester resin and of each of the thus treated samples of polyester resin was determined in a 60/40 phenol-tetrachloroethane mixed solvent at 30.0° C. The percent of broken bonds was calculated for each sample of resin using the following formula:

$$\text{Percent of broken linkages} = \frac{IV_{in} - IV_{degraded}}{IV_{in} - IV_{degraded}} \times C \times 100$$

in which $IV_{in}$ = intrinsic viscosity of the polymer before thermal degradation,
$IV_{degraded}$ = intrinsic viscosity after thermal treatment,
C = a factor which depends on the viscosity range of the sample.

The following average values of C were used in these calculations:

| Intrinsic Viscosity Range | Conversion Factor C |
|---|---|
| 0.75 – 0.65 | 0.396 |
| 0.70 – 0.60 | 0.401 |
| 0.65 – 0.55 | 0.409 |
| – –0.50 | 0.417 |
| 0.55 – 0.45 | 0.422 |
| 0.50 – 0.40 | 0.435 |

The percent of broken bonds on exposure to steam (or hydrolytic stability) of each of the resins was determined as follows:

A portion of the polymer sample was cut into particles having a diameter of about two millimeters. About one gram of these particles was heated at 140° C. under one Torr for 16 hours.

The polymer was then transferred to a 400 milliliter stainless steel beaker containing 20 milliliters of distilled water. The beaker was placed in a steam sterilizer and heated at 120° C. for six hours. The polymer was recovered from the water by filtration, rinsed with acetone, and dried for three hours at 60° C. at atmospheric pressure and then for 16 hours at 140° C. and one Torr. The intrinsic viscosity of the thus treated polymer was determined in a 60/40 phenol-tetrachloroethane mixed solvent at 30.0° C. The percent of broken bonds due to the hydrolysis treatment was calculated for each sample of resin using the following formula:

$$\text{Percent of broken bonds} = \frac{IV_{in} - IV_{hydro}}{IV_{in} \times IV_{hydro}} \times C \times 100$$

in which $IV_{in}$ = intrinsic viscosity of the original polymer,
$IV_{hydro}$ = intrinsic viscosity of the hydrolyzed polymer.

In Table II below the results of the hydrolytic stability tests run on the preceding examples and on the du Pont T-64 (ethylene terephthalate-metallosulfoisophthalate) fibers are summarized:

TABLE II

| Composition | HD* | I.V.** |
|---|---|---|
| 97/3 Ethylene terephthalate/potassium sulfophenylindanate | 0.86% BB | 0.468 |
| 97/3 Ethylene terephthalate/potassium sulfophenylindanate | 2.3% BB | 0.498 |
| 98/2 Ethylene terephthalate/potassium sulfophenylindanate | 1.86% BB | 0.429 |
| 97.5/2.5 Ethylene terephthalate/potassium sulfophenylindanate | 0.34% BB | 0.448 |
| T-64 (Ethylene terephthalate/metallosulfoisophthalate) (Control Sample) | 3.40% BB | 0.391 |

*HD - Hydrolytic degradation
**IV - Intrinsic viscosity

These data indicate that the polymers of this invention have greatly improved hydrolytic stabilities.

Preferably the copolyesters contain at least 0.5 mol percent of an alkali metal salt of sulfophenylindan dicarboxylic acid units based on the total number of mols of acid units in the copolyester structure. The copolyesters can contain up to about 10 mol percent of an alkali metal salt of sulfophenylindan dicarboxylic acid units. The copolyesters contain from 1 to 4 mol percent of the sulfophenylindan dicarboxylic acid units, and thus contain ethylene terephthalate and ethylene sulfophenylindan dicarboxylic acid units in the ratio of 99 to 96 percent of ethylene terephthalate units and from 1 to 4 percent of ethylene sulfophenylindan dicarboxylic acid units. The preferred copolyesters are the ethylene terephthalate-ethylene sulfophenylindan dicarboxylic acid copolyesters containing ethylene terephthalate and ethylene sulfophenylindan dicarboxylic acid units in ratio of 97:3.

In the preparation of the polymeric polyesters the preparation of the glycol esters and the polymerization are, in general, carried out in accordance with the usual known techniques. Thus the reactions are preferably carried out in the absence of oxygen, generally in an atmosphere of an inert gas such as nitrogen or the like in order to lessen darkening and to make it possible to obtain a high molecular weight pale or colorless product. The polymerization or condensation reaction is carried out under reduced pressure, generally below 10 Torr and usually at or below one Torr, at a temperature in the range of from 260° to 290° C. The high molecular weight resin formed has an intrinsic viscosity of at least 0.3 and usually 0.4 or higher as determined in a 60/40 phenol-tetrachloroethane mixed solvent at 30° C.

Various catalysts can be used for the ester interchange reaction. Suitable catalysts are catalysts such as zinc acetate, manganese acetate, lead acetate and litharge. Also, various catalysts can be used for the condensation reaction. Suitable catalysts are antimony trioxide, litharge, lead acetate, glycol soluble compounds of titanium and glycol soluble compounds of cobalt.

Yarns produced from the copolyesters of the present invention are suitable for use in various textile applications. They have particular affinity towards basic dyes. Thus, cationic dyes can be readily applied to filaments of these copolyesters.

The practice of this invention has been illustrated with particular respect to copolymers with ethylene terephthalate. Various polyesters and copolyesters can be made containing the metallosulfophenylindanate group. The polyester resins can be prepared from various dicarboxylic acids and glycol and from mixtures of acids and mixtures of glycols. Thus the invention is applicable also to the manufacture of modified linear polyesters of other acids and/or other glycols. Representative examples of other acids are aliphatic acids of the general formula

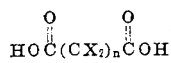

where X is hydrogen or a low alkyl group and n is zero to ten, such as oxalic acid, malonic acid, succcinic acid, glutaric acid, adipic acid, sebacic acid, suberic acid, etc.; methyl succinic acid, α-methyl adipic acid; aromatic acids such as the phthalic acids, the naphthalene dicarboxylic acids, the diphenyl dicarboxylic acids; and araliphatic acids such as α,β-diphenyl ethane-4,4'-dicarboxylic acid, α,β-diphenyl butane 4,4'-dicarboxylic acid. Representative examples of other glycols that can be used are the propylene glycols, the butylene glycols, pentamethylene glycol, decamethylene glycol, alkyl substituted polymethylene glycols such as 2,2-dimethyl 1,3-propane diol, 2,2-diethyl-1,3-propane diol, diethylene glycol, 2,2-bis[4-(β-hydroxyethoxy)phenyl] propane and cyclohexane dimethanol. The phthalic acids and ethylene glycol are preferred because of their low cost and ready availability.

A portion of any of the above aromatic acids may be replaced with 1 to 10 mol percent (of the total acid content) by acid such as isophthalic, adipic, azelaic, sebacic, dodecandioic or dimer acid.

While certain representative embodiments and details have been shown for the purpose of illustrating the invention it will be apparent to those skilled in this art that various changes and modifications may be made therein without departing from the spirit or scope of the invention.

What I claim is:

1. As new compositions of matter sulfo-phenylindan dicarboxylates having the formula

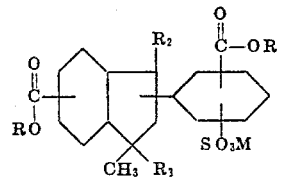

in which M is an alkali metal and R is selected from the group consisting of hydrogen and radicals selected from alkyl radicals containing from 1 to 10 carbon atoms, phenyl, talyl, ethylphenyl, benzyl and phenylethyl and R₂ and R₃ are selected from alkyl radicals containing one to four carbon atoms.

2. As new compositions of matter sulfonic acids having the formula

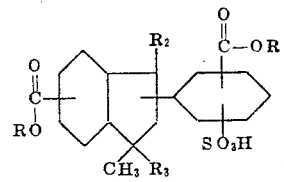

in which R is selected from the group consisting of hydrogen and radicals selected from alkyl radicals containing from one to 10 carbon atoms, phenyl, toluene, ethylphenyl, benzyl and phenylethyl and R₂ and ₃ are selected from alkyl radicals containing one to four carbon atoms.

3. A composition according to claim 2 having the formula

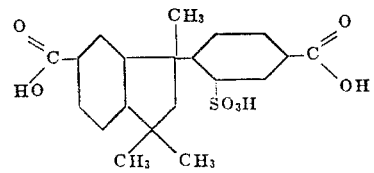

* * * * *

PO-1050
(5/69)

UNITED STATES PATENT OFFICE
CERTIFICATE OF CORRECTION

Patent No. 3,716,582  Dated February 13, 1973

Inventor(s) Max H. Keck

It is certified that error appears in the above-identified patent and that said Letters Patent are hereby corrected as shown below:

Column 2, line 17, "1-methyl 17" should be -- 1-methyl-7 --.

Column 6, line 5, "--0.50" should be -- 0.60 - 0.50 --.

Column 8, line 32, "talyl" should be -- tolyl--.

Signed and sealed this 25th day of December 1973.

(SEAL)
Attest:

EDWARD M. FLETCHER, JR.       RENE D. TEGTMEYER
Attesting Officer             Acting Commissioner of Patents